United States Patent [19]

Bubak

[11] Patent Number: 4,592,455
[45] Date of Patent: Jun. 3, 1986

[54] CLUTCH AND TRANSMISSION BRAKE ASSEMBLY

[75] Inventor: John Bubak, Pontiac, Mich.
[73] Assignee: Massey-Ferguson Inc., Detroit, Mich.
[21] Appl. No.: 508,794
[22] Filed: Jun. 28, 1983
[51] Int. Cl.$^4$ .................. F16D 67/04; F16D 25/062
[52] U.S. Cl. ............................ 192/13 R; 192/18 A; 192/87.13; 74/478
[58] Field of Search .............. 192/12 C, 13 R, 18 A, 192/48.7, 87.13; 74/478

[56] References Cited

U.S. PATENT DOCUMENTS

| | | | |
|---|---|---|---|
| 3,042,165 | 7/1962 | Yokel | 192/85 |
| 3,157,257 | 11/1964 | Root | 192/18 |
| 3,213,989 | 10/1965 | Harting | 192/86 |
| 3,306,408 | 2/1967 | Kahle | 192/85 |
| 3,363,728 | 1/1968 | Stengelin et al. | 188/90 |
| 3,432,014 | 3/1969 | Iwamatsu et al. | 192/18 |
| 3,441,114 | 4/1969 | Pensa | 192/18 A X |
| 3,463,278 | 8/1969 | Broeker et al. | 192/18 A X |
| 3,614,998 | 10/1971 | Houtz | 192/12 C X |
| 3,667,583 | 6/1972 | Richards | 192/105 A |
| 3,709,344 | 1/1973 | Sieren | 192/0.046 |
| 3,744,608 | 7/1973 | Newman | 192/105 A |
| 3,840,099 | 10/1974 | Higuchi et al. | 192/4 A |
| 3,853,210 | 12/1974 | Kitano et al. | 192/4 C |
| 4,282,775 | 8/1981 | Van Dest | 74/740 |

FOREIGN PATENT DOCUMENTS 120113  5/1946  Australia ............... 192/12 C

Primary Examiner—Rodney H. Bonck
Assistant Examiner—Richard M. Lorence
Attorney, Agent, or Firm—Robert L. Farris

[57] ABSTRACT

A clutch and transmission brake assembly which can be readily incorporated into existing vehicle drive trains without undue modification. The assembly includes a wet clutch connectable to a flywheel and a transmission brake adapted to be disposed between the wet clutch and a transmission housing, the clutch and transmission brake being operated by annular pistons (56, 118). The assembly further includes a control assembly including pressure responsive valves (202, 204) which are operated sequentially by cams (268, 270). A pedal is suitably interconnected with the cams in such a manner that the clutch will be progressively disengaged as the pedal moves from an initial position towards its depressed position, the clutch pedal passing through a dwell position before the brake is progressively applied. The clutch will be fully disengaged when the pedal is in its dwell position, and as the transmission brake is applied there will be an increase in pedal effort.

9 Claims, 8 Drawing Figures

CLUTCH AND TRANSMISSION BRAKE ASSEMBLY

FIELD OF THE INVENTION

The present invention relates to a clutch and transmission brake assembly, which assembly includes various control devices and more particularly to such an assembly which can be installed in vehicles or the like without undue modification to the vehicle.

BACKGROUND OF THE INVENTION

Vehicles are traditionally provided with two forms of transmission, one form being a so-called automatic transmission, and the other form being a manual shift transmission. In order to change from one gear range to another with a manual shift transmission it is necessary to provide a clutch which is traditionally interposed between the engine or motor and the transmission. During shifting the gears will tend to clash unless means are provided to synchronize the rotational speeds of the transmission, such means being referred to as synchronizers. Clashing of the gears can also be avoided by causing the rotational speeds of the input and output sections to be brought down to a negligible speed, and this can be accomplished by the use of a transmission brake. Various forms of transmission brakes have been provided in the art and typically, when using a dry clutch, a rotating portion of the clutch when disengaged is brought into contact with a stationary element to stop the clutch from rotating and therefore serving to brake the input side of the transmission. When using hydraulically actuated wet clutches it is generally customary to provide a transmission brake which is internal of the transmission, the brake being fluid operated in a sequential manner after the clutch has been disengaged. The location of the brake within the transmission has been in part due to the fact that in the past when utilizing wet clutches it has been customary to redesign the entire clutch and transmission housing area, as known prior art wet clutches customarily operate in a stationary sealed housing which contains the oil used for cooling the clutch.

OBJECTS AND SUMMARY OF THE INVENTION

It is an object of the present invention to provide a novel clutch and transmission brake assembly which can readily be incorporated into existing vehicle drive trains without undue modification.

More particularly, it is an object of the present invention to provide a clutch and transmission brake assembly including a clutch housing which can be secured to a motor and a transmission brake which can be secured to the exterior of a transmission, the assembly further including controls which can be readily mounted upon the vehicle in a package which can be readily connected to a standard clutch brake pedal. Thus, in accordance with this invention a hydraulically operated wet clutch, which can operate in a dry compartment, is connected to an engine flywheel, a transmission brake coaxial with the wet clutch extending between the wet clutch and the forward end of the transmission housing. Both the wet clutch and the transmission brake are provided with hydraulically operated pistons. A mounting bracket is provided on which a pair of pressure responsive valves are mounted, each of the valves being engaged by a cam lobe of a cam assembly also rotatably mounted on the same mounting bracket, the cam lobes being able to sequentially operate the valves. The valves are interconnected with the pistons by suitable hydraulic lines and cause the pistons to be sequentially operated. The cams are interconnected with a lever which is in turn connected to a vehicle clutch pedal. Suitable spring means are provided which cause brake pedal effort to substantially increase after the clutch has been released and prior to the transmission brake being applied. It is an additional feature of the present invention to cause the pressure within the clutch to initially drop to a high intermediate level as the clutch pedal is initially moved, the pressure then dropping within the clutch at a relatively slow rate to permit inching until the pressure has dropped to such a low level that the clutch is no longer engaged. The clutch pedal will then enter a dwell position where neither the clutch nor the transmission brake is engaged, and as the clutch pedal movement is continued away from its raised stop position it will cause the second valve to increase the pressure behind the transmission brake piston to gradually apply the transmission brake, the arrangement being such that during this portion of movement the pedal effort is substantially increased.

The foregoing and other ogjects and advantages of the present invention will become more apparent from a consideration of the following detailed description taken in conjunction with the accompanying drawings in which a preferred form of this invention is illustrated.

DETAILED DESCRIPTION

Clutch and Transmission Brake

Figure 1:
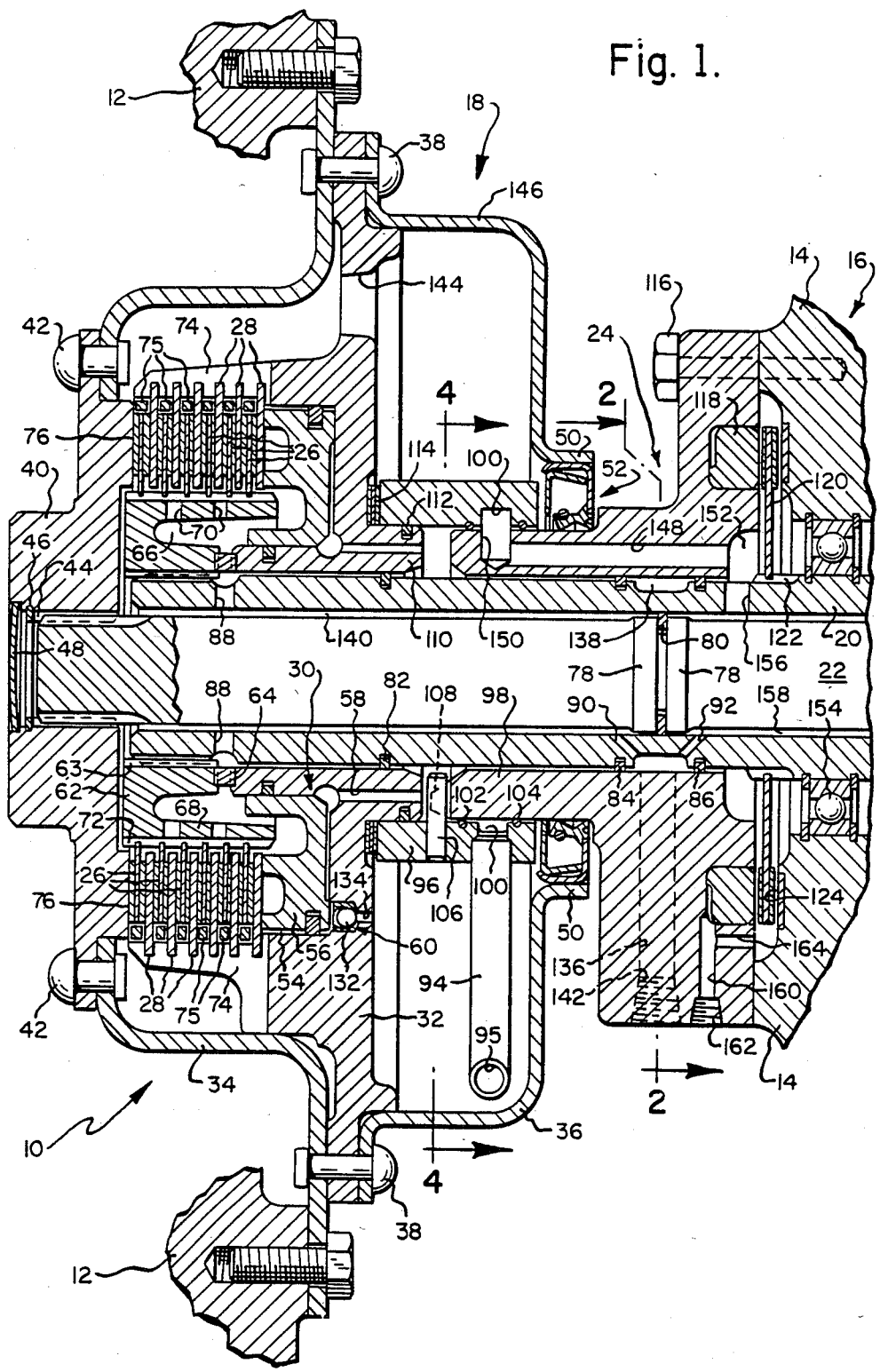
FIG. 1 is a sectional view of an improved clutch and transmission brake showing how they are interrelated with a flywheel and a transmission housing of a vehicle, portions being shown somewhat schematically.

Referring first to FIG. 1, an oil cooled and hydraulically operated clutch is indicated generally at 10. This clutch is operatively disposed between an engine flywheel 12 and a transmission which is disposed within a transmission housing 14. In addition to the clutch 10, a transmission brake, which will be described below, is indicated generally at 16, and is disposed between the clutch and the transmission housing 14.

The clutch assembly 10 includes a number of major operative components including a clutch housing indicated generally at 18, an output or drive shaft 20, which is also the input shaft to the transmission, and a power takeoff (PTO) shaft 22 which is coaxial with the output shaft 20 and is, in fact, disposed within the output shaft. The transmission may be of the type shown in U.S. Pat. No. 4,282,775, the disclosure of which is incorporated herein by reference thereto. Other components are a non-rotatable support member, indicated generally at 24, in which various fluid passageways or conduits are disposed, sealing means which extend between the housing 18 and the output shaft 20, and one or more axially shiftable clutch disks 26 which are interleaved with steel plates 28, the clutch disks being interconnected with the output shaft 20 for rotation therewith. Additional elements of the clutch are fluid pressure operated engaging means, indicated generally at 30, which is capable of causing the clutch disks 26 to be held for rotation with the clutch housing 18, fluid means capable of introducing cooling oil into the clutch housing, and scavenging means capable of removing the cooling oil from the housing.

It is a feature of the clutch housing 18 that the oil used for cooling the clutch disks is contained within the housing during rotation and is subsequently scavenged by the scavenging means for removal to a location exterior of the clutch housing. This feature permits the utilization of the clutch assembly within a drive train housing which extends between an engine and transmission and which is not sealed, thus eliminating the necessity of sealing apertures used for the starting motor, inspection hole, etc.

The clutch housing 18 includes a machined central portion 32, a forward drive flange 34, and a rear seal carrier 36. The central portion 32, the forward drive flange 34, and the rear seal carrier 36, are secured to each other by means of rivets 38. A PTO drive hub 40 is secured to the forward drive flange 34 by means of rivets 42. The drive hub is provided with an internal aperture coaxial with the flywheel 12, which aperture is provided with splines 44. Disposed to one side of the splines are a snap ring 46 and a seal 48. The forward end of the PTO shaft is splined and interengages the splines 44, which will cause the PTO shaft 22 and clutch housing to rotate together. The rear seal carrier 36 has a cylindrical lip 50 which defines an aperture to the rear of the housing 18, the lip having a seal assembly 52 mounted therein. The seal assembly 52 is part of the sealing means which will be described further below.

The machined central portion 32 is provided with an annular chamber 54 which receives an annular piston 56 capable of axial movement between engaged and disengaged positions, the disengaged position being illustrated in FIG. 1. A bore 58 extends to one side of the chamber 54 for the introduction of hydraulic fluid into the chamber 54. A portion of the machined central portion 32 is provided with a centrifugal check valve assembly 60 which facilitates the discharge of hydraulic fluid from the chamber 54 when the piston 56 is being moved to its retracted position.

Mounted on the forward end of the output shaft 22 is a clutch output drive hub 62. As can be seen from FIG. 1, the hub is provided with internal splines 63 which engage external splines on the shaft 20. A separator in the form of a wave washer 64 is disposed between the inner rear surface of the clutch output drive hub 62 and a corresponding portion of the machined central portion 32. This separator permits the flow of oil between the drive hub 62 and the machined central portion 32. As can be seen from FIG. 1 the drive hub 62 is provided with an internal annular recess 66 and a radial outer cylindrical portion 68 provided with apertures 70 through which cooling oil may flow. The outer surface of the radial outer cylindrical portion 68 is provided with keys or splines 72 on which the clutch disks 26 are mounted for sliding axial movement. The machined central portion is provided with circumferentially spaced apart forwardly extending portions 74 to which the steel plates 28 are keyed for axially sliding movement. Disposed between the steel plates 28 beyond the periphery of the clutch disks 26 are wave washers 75 which will force the plates apart when the piston 56 is in its retracted position. Thus, when the piston is in the retracted position as shown in FIG. 1, the clutch disks will be free to rotate relative to the steel plates and drive hub 40. However, when the piston 56 is caused to be moved to the left to its engaged position it will compress the wave washers 75, and cause the clutch disks 26 to be engaged between the steel plates 28 and the reaction surface 76 of the drive hub 40, thereby causing said clutch disks 26 to rotate with the hub 40 and to cause attendant rotation of the shaft 20.

As can be seen from FIG. 1 the PTO shaft 22 is disposed within the output shaft 20. As can be further seen, except for a midportion 78 provided with a fluid seal 80, the diameter of the PTO shaft 22 is less than the internal diameter of the output shaft 20. Thus there are spaces between the two shafts extending forwardly and rearwardly of the seal 80 and enlarged portion 78 which can serve as fluid passageways.

The output shaft 20 is provided with axially spaced apart fluid seals 82, 84, 86. In addition, the output shaft is provided with first, second, and third axially spaced apart sets of radially extending bores 88, 90, 92, respectively. The seal assembly 52 and the seal 84 act as the sealing means which are operable to provide an oil seal between the periphery of the output shaft and the aperture in the end of the housing as defined by lip 50.

The scavenger means includes a pitot-like tube 94 disposed within the housing 18 and supported on the non-rotatable support member 24. As can be seen the pitot-like tube 94 has an open end 95 disposed adjacent the periphery of the housing 18, 36 and is capable of scavenging any cooling oil or piston fluid from within the housing in the event that there is relative rotation between the housing and the pitot-like tube. When there is such relative rotation, the rotational velocity of the housing 18 will impose a force reaction on the oil due to its mass density, the shear force creating a velocity and a pressure gradient. As the scavenge assembly is essentially stationary, a hydraulic pressure head will be created, and consequently, oil will flow into the pitot-like tube. As can be seen the pitot-like tube is secured to a cylindrical member 96 which is journaled about an annular portion 98 of the non-rotatable support member 24. The cylindrical member 96 is provided with an annular chamber 100 which is maintained in a fluid sealed relationship with the outer surface of the annular portion 98 by seals 102, 104 in the form of O rings. As can further be seen the cylindrical member 96 would be free to rotate about the axis of the output shaft 20 and the annular portion 98 if means to restrain its rotational movement were not provided. Such means are provided in the form of a pin 106 which passes through a suitable aperture in the cylindrical member 96 and engages a projection 108 of the annular portion 98. The forward end of the cylindrical member 96 overlies a rearward cylindrical projection 110 of the machined central portion 32 of the housing 18 and is held in a sealed relationship therewith by means of a fluid seal 112. A bearing 114 is disposed between the forward end of the cylindrical member 96 and an associated portion of the central portion 32 of the housing 18.

The non-rotatable member 24 is secured to the transmission housing 14 by means of bolts 116, only one being shown in FIG. 1. The non-rotatable housing serves in part as a housing for the transmission brake and is provided with an annular chamber which receives an annular piston 118 which can be moved between a retracted position, such as that shown in FIG. 1, to an extended position wherein it engages a transmission brake disk 120 which is secured to an intermediate splined portion 122 on shaft 20. When the transmission brake piston is caused to be moved from its retracted position to its extended position the brake disk 120 will be trapped between the piston 116 and a reaction surface 124 on the transmission housing 14.

Figure 2:
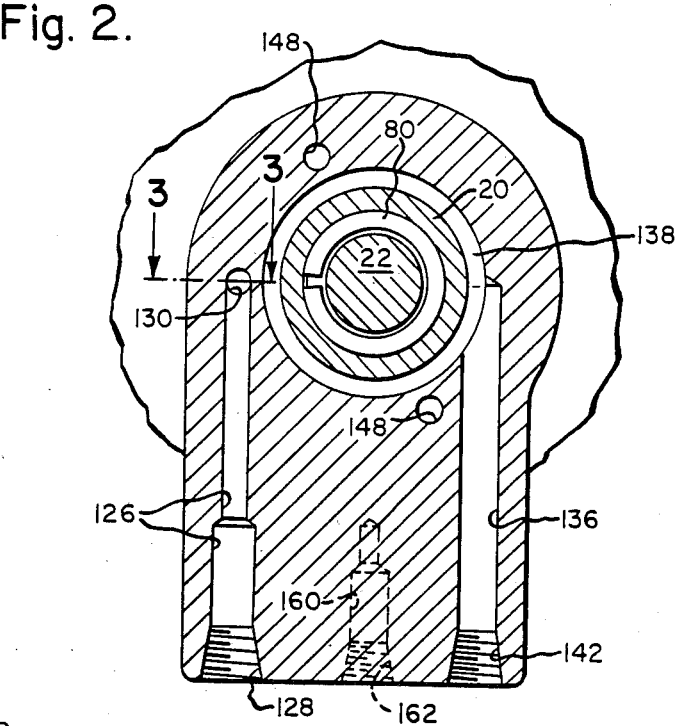
FIG. 2 is a sectional view taken generally along the line 2—2 in FIG. 1 showing the relationship of various fluid passageways as they actually exist in a preferred embodiment.
Figure 4:
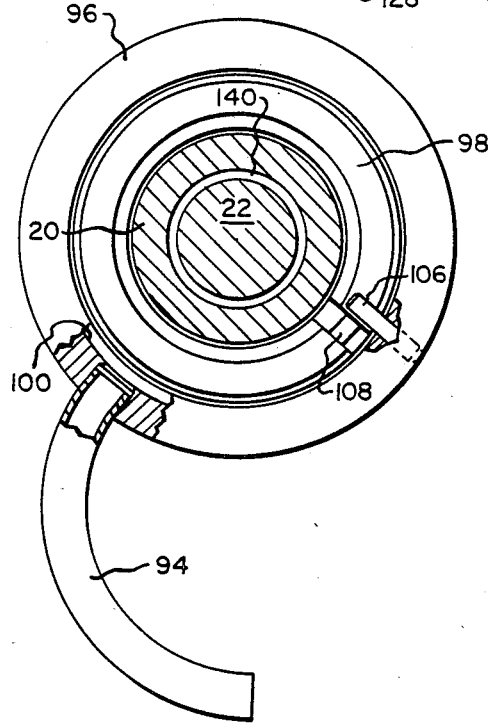
FIG. 4 is a sectional view taken along the line 4—4 in FIG. 1 and showing the relationship of various parts as they actually exist in a preferred embodiment.
Figure 3:
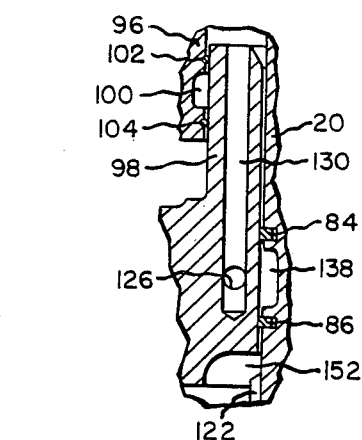
FIG. 3 is a sectional view taken generally along the line 3—3 in FIG. 2.

The non-rotatable member 24 is also provided with various passageways. These passageways are shown somewhat schematically in FIG. 1 but their actual construction in a preferred embodiment is shown more accurately in FIGS. 2 and 3. Thus, a control passageway for controlling the operation of the piston 56 is provided, the control passageway including a first bore 126 provided with a threaded end portion 128 for the reception of a suitable fluid fitting. The bore 126 extends inwardly to an axially extending bore 130 (FIG. 3) which terminates at a forward end of the cylindrical extension 98. Fluid introduced under pressure into the bore 126 will flow through the bore 126, bore 130, and into the further bore 58 by means of the passageway defined by the chamber between the cylindrical member 96 and the output shaft 20 and isolated by seals 112, 82, 84 and 102. The continued introduction of fluid under pressure into the bore 126 will thus cause the piston 56 to be moved from its retracted position towards its engaged position. When this happens, the fluid will force the ball 132 of the check valve assembly into its seat, preventing further loss of fluid through the check valve passageway 134.

The non-rotatable member 24 is provided with another bore 136 parallel to the first bore 126 which bore extends through the non-rotatable member 24 to annular chamber 138 which is defined in part by the periphery of the output shaft 22 between seals 84 and 86. This chamber is in turn in communication through bore 90 with the fluid passageway 140 which is formed by the space between the PTO shaft 22 and the internal diameter of the output shaft 20 forward of the seal 80. As in the case with the bore 126, the bore 136 is provided with a threaded end portion 142 for the reception of a suitable fluid fitting. Cooling oil or fluid introduced into the bore 136 through the fitting disposed within the threaded end portion 142 will then flow through the second passageway formed of bore 136, bore 90, fluid passageway 140, bore 88, annular recess 66, apertures 70, and past the clutch disks 26 serving to lubricate and cool the disks. As the hub 40 rotates such cooling oil will be thrown by centrifugal force to the periphery of the forward drive flange 34 and will then exit through the apertures 144 formed in the machined central portion 32 and lie against the periphery 146 of the rear seal carrier housing portion 36. As the cooling oil and any piston oil which exits through the check valve passageway 34 will have a rotation imparted to it by the rotating housing 18, it will be scooped up by the pitot-like tube 94 and forced inwardly of the tube and into chamber 100. The chamber 100 is in turn interconnected with an axially extending bore 148 in member 24 by a radially outwardly extending passageway 150. Thus, flow from the pitot-like tube will be through third passageway means formed of chamber 100, bore 150, and bore 148. This flow will be discharged into chamber 152 disposed between the rear of the non-rotatable member 24 and the forward wall of the transmission housing 14. Fluid from chamber 152 can in turn be discharged to the interior of the transmission either through the ball bearing assembly 154 or through radial bores (not shown) in the shaft 20 disposed within the transmission housing, the bores being in communication with the chamber 152 by means of a radial bore 156 in the output shaft disposed adjacent the chamber 152, and a passageway 158 extending between the periphery of the PTO shaft 22 and the internal diameter of the output shaft 20. Additional fluid flow to the passageway 158 is provided in order to insure for proper lubrication of the transmission. This is accomplished through the bore 92 in the output shaft, the bore 92 being in communication with passageway 158. It should be noted that as the bores 90 and 92 act as restrictors, the normal pressure in passageways 140 and 158 from the flow of fluid into the bore 136 will be quite low. Thus the fluid within bore 158 will not offer any back pressure resistance downstream of bore 92 with respect to the flow of fluid from the pitot-like tube which operates at a substantially higher pressure when it is in fact scooping up excess oil.

At this point it should be observed that as the cooling oil and the fluid used for causing the pistons to be moved from their disengaged positions to their engaged positions are subsequently merged, a single grade of fluid will be used for these purposes.

As previously noted the transmission brake disk 120 is caused to be engaged between the annular piston 118 and a reaction surface 124 by causing fluid under pressure to be introduced behind the pistons 118. To this end the non-rotatable member 24 is provided with a further bore 160 which is in direct communication with the chamber behind the piston 118, this further bore 160 also being provided with a threaded end portion 162 to which a suitable hydraulic fitting may be secured. During the operation of the transmission brake 16 a relatively large supply of oil is fed into the bore 160, the excess fluid not required for the operation of the piston 118 passing through bore 164 into chamber 152 for the purpose of cooling the brake disk 120.

At this point it should be observed that in normal operation fluid will constantly be flowing into bore 136 through a fitting threaded into the threaded end portion 142, the flow of fluid being necessary to constantly provide transmission lubrication and also to provide cooling oil for the clutch disks when desired. However, the flow into the bores 126 and 160 will be regulated by suitable control valves to insure their proper operation and also to insure that the transmission brake is not engaged when the clutch is engaged, and vice versa. To this end a control assembly including suitable valves is provided.

Control Assembly

Figure 6:
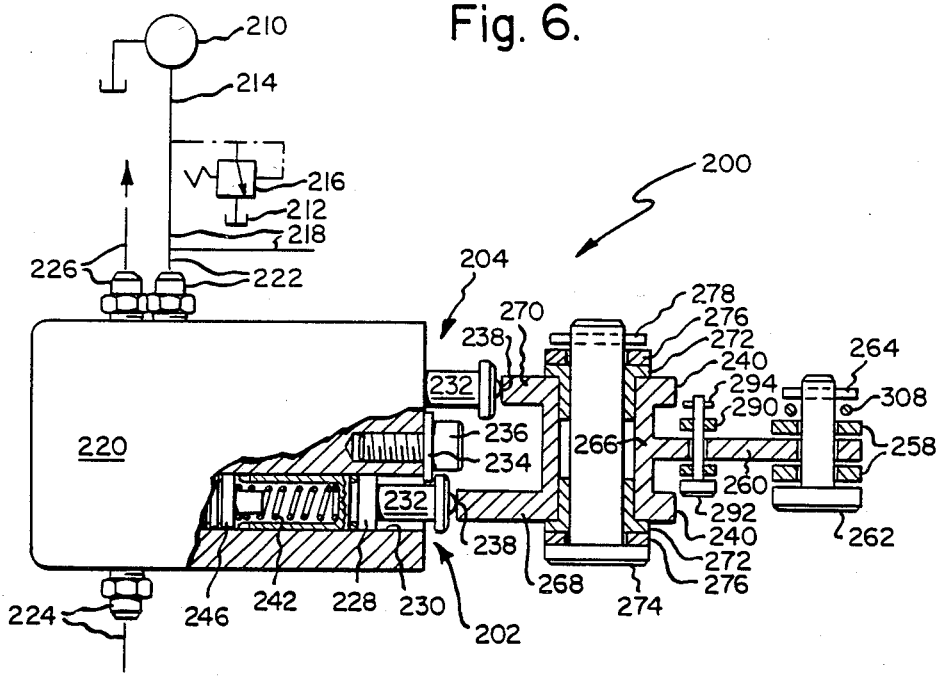
FIG. 6 is a partial sectional view taken generally along the line 6—6 in FIG. 5.
Figure 5:
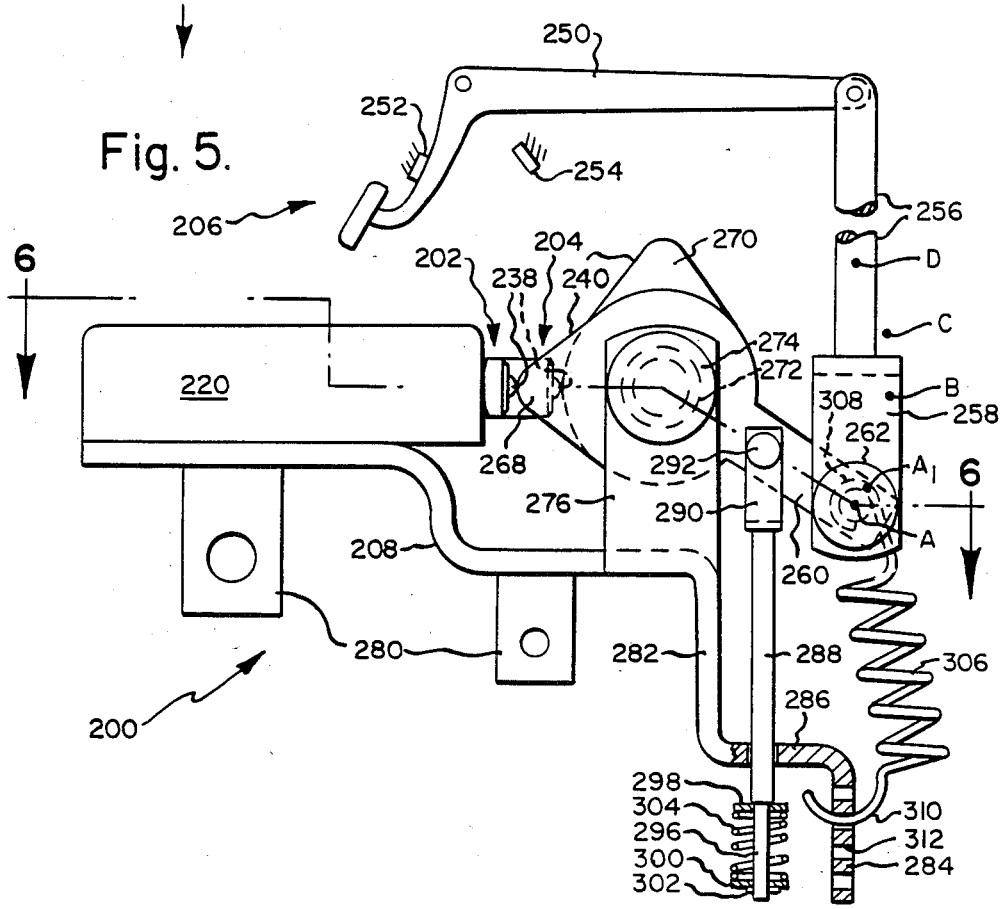
FIG. 5 is a side view of the operating means of the clutch and transmission brake shown in FIG. 1, and further illustrates how various portions of the operating means are mounted on a common bracket.
Figures 7, 8:
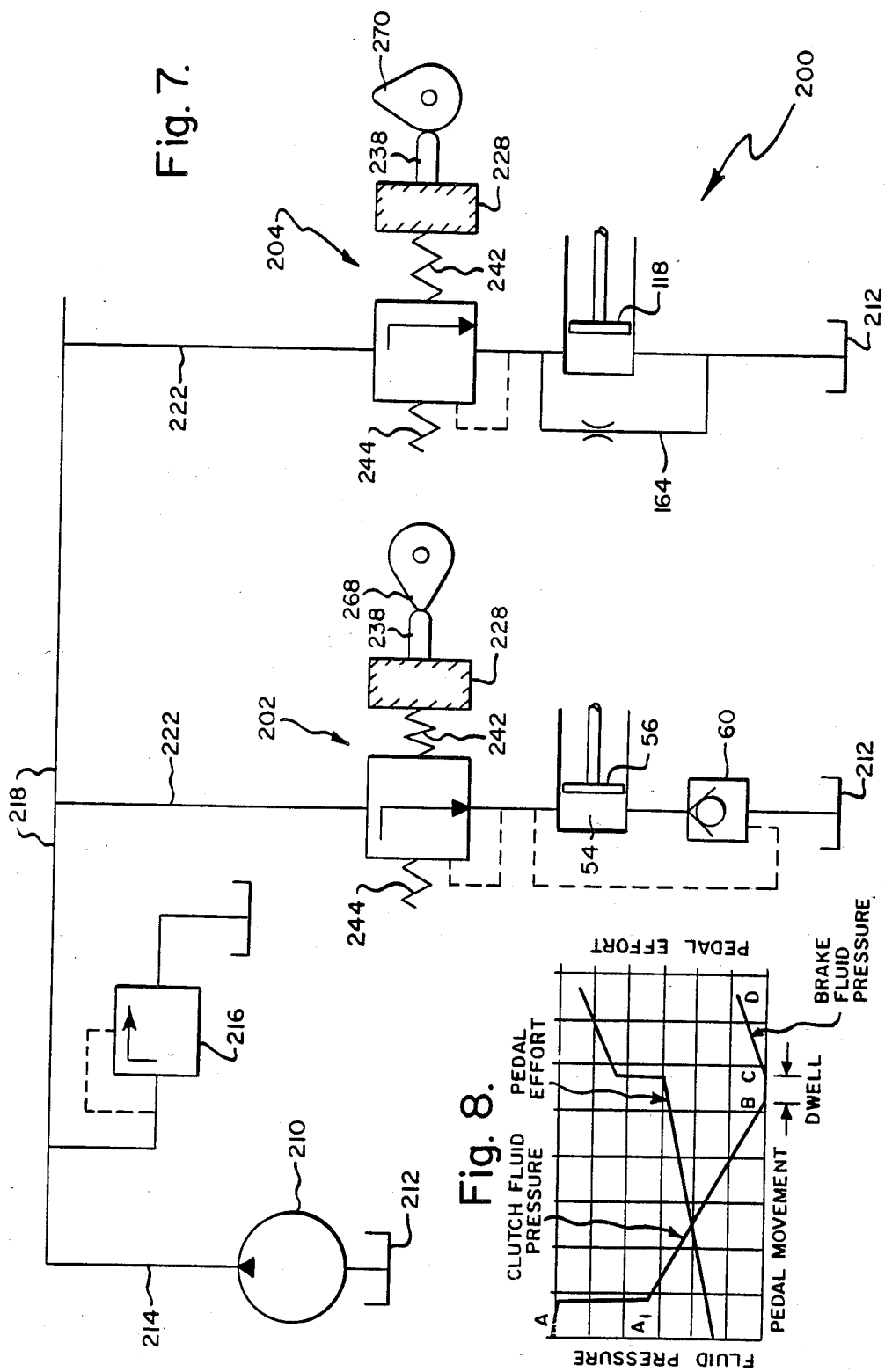
FIG. 7 is a graphic representation of various of the hydraulic components utilized in the clutch and transmission brake assembly.
FIG. 8 is a graph illustrating various pressure changes during the operation of the clutch and transmission brake assembly.

Referring now in detail to FIGS. 5, 6, and 7 the control assembly is indicated generally at 200 and includes first and second adjacent control valves indicated generally at 202 and 204, respectively, the valves forming part of first and second engaging means. The valves 202 and 204 are of the pressure regulating type and are adapted to be operated by operating means indicated generally at 206 (FIG. 5). The valves 202 and 204 as well as principal components of the operating means 206 are adapted to be mounted on a bracket 208 which can be readily secured to a portion of the framework of the vehicle with which the clutch and transmission brake are associated.

The first and second engaging means include a source of fluid under pressure, such as a pump 210 which, during operation, draws fluid from a reservoir 212 and forces it through a high pressure line 214 past pressure control valve 216. The valve 216 may be set at, for example 20 bars and this will regulate system pressure in main downstream line 218. Each of the first and second engaging means includes an input to the associated valve. If the valves are in separate housings separate input lines would be provided. However, as can be seen From FIG. 6, the valves are in fact in a common housing 220 and a single input line 222 is provided from line 218. Each of the valves 202 and 204 is provided with a separate discharge line 224, 226, respectively. These lines are in turn connected with various ports and passageways within the clutch and transmission brake. The first engaging means includes, in addition to valve 202, fluid passageways to the chamber 54. These include line 224 which is connected with port 128 and bores 126, 130 and 158. Thus, fluid under pressure may flow through line 224, bore 126, bore 130, and bore 158 into chamber 54. Similarly, the second engaging means also includes the output line 226 which is connected at the end remote from the valve housing 220 with port 162, and fluid flowing through the line 226 can then pass through bore 160 to the chamber behind the transmission brake system 118, additional fluid passing through restrictor line 164 and eventually to reservoir 212.

Each of the valves 202 and 204 are similar and include a cylindrical actuating member 228 received within a cylindrical bore 230. Each of the actuating members 228 is provided with a cylindrical recess areas 232 which can receive a washer 234 held in place on housing 220 by fastener 236, the washer limiting the movement of the actuating member 228. The end of each of the actuating members 228 carries a hardened steel cam follower 238 which can be engaged by the surface 240 of a cam. When the cam surface is spaced away from the housing its greatest extent the actuating member will be biased to an outward position by springs 242 and 244 (FIG. 7) disposed on opposite sides of a spool 246 (FIG. 6). While the spools 246 and the porting in bores 230 are not shown it should be noted that these valves are so designed that when actuated in the manner to be described in greater detail below that the pressures shown in the graph of FIG. 8 will be developed.

The operating means which has been indicated generally at 206, includes a conventional clutch pedal. In order to simplify the drawings the clutch pedal has been illustrated as a bell crank 250 movable from a first position wherein one arm of the bell crank bears against stop 252 to a second position where the arm bears against stop 254. As illustrated the bell crank 250 has one end remote from that portion engaged by the operator pivotally connected to a link 256. The other end of the link 256 is provided with a clevis 258 which is in turn interconnected to one end of a cam operating lever 260 by means of a pivot pin 262 and cotter pin 264. The other end of the cam operating lever 260 is integral with a cylindrical portion 266 on which are mounted spaced apart cams 268 and 270. which can be rotated about the axis of the portion 266, i.e., about a common axis. Each of the cams has a cam surface 240. The cylindrical portion 266 is in turn supported by spaced apart bushings 272 which receive pin 274. The pin 274 passes through not only the bushing 272 but also spaced apart arms 276 which extend upwardly from bracket 208 as illustrated in FIG. 5. The pin 274 is in turn held in place by cotter pin 278. The bracket 208 in addition to being provided with the pair of spaced apart arms 276 is also provided with a pair of depending apertured arms 280 which may be secured to a portion of the vehicle. The bracket 208 is further provided with other portions including two spaced apart vertical portions 282 and 284 interconnected by a horizontal portion 286, the horizontal portion 286 being provided with a suitable aperture through which a portion of a link 288 passes. One end of the link 288 is provided with a clevis 290 which is secured to a portion of the cam operating lever 260 by means of pivot pin 292 and cotter pin 294. The other end of the link 288 is provided with a reduced portion 296. A washer 298 is disposed between the shoulder formed between the reduced diameter section 296 and the full diameter section of the link 288. Another washer 300 is disposed at the end of the link 288 remote from the clevis 290, the washer being retained by a pin 302. Disposed between the washers 298 and 300 is a spring 304 which is held in compression. Another spring extends between the pivot pin 262 and the vertical portion of the bracket 284. To this end, the other spring 306 is provided with suitable end loops, the upper end loop 308 passing over a portion of the pivot pin 262, and the lower end loop 310 being received within one of the plurality of vertically spaced apart vertical apertures 312. It can be seen that by adjusting the position of the end loop 310 within one of the apertures 312 that the tension on the spring 306 may be varied.

Operation

When the cams are in the position illustrated schematically in FIG. 7 the clutch piston 56 will be disposed in its engaged position and fluid in chamber 54 will be subject to full system pressure as it is in communication with line 218 through line 222, valve 202, line 224, and bores 126, 130, and 58. At the same time the fluid in the chamber behind the transmission brake piston 118 is in communication with reservoir through restrictor line 164, chamber 152 and passageway 158, the spool 228 in valve 204 blocking the flow of fluid from line 222 to line 226. When the vehicle operator steps on the clutch pedal 250 it will move from its normal fully raised position or first position, wherein it is biased against stop 252 by spring 306, towards a second position wherein it engages stop 254. As the pedal moves between these two positions it will pass through an intermediate and dwell positions. These positions are indicated in association with the end of the cam operating lever 260 and also at various places in FIG. 8, the first position being indicated at A, the second position being indicated at D, a dwell position being indicated at B and C, and an intermediate position between the First position A and the dwell position B being indicated at A1. Thus, when the vehicle operator steps on the clutch pedal 250 it will move from the first position A to a first intermediate position indicated by A1. During this initial movement the valve 202 will cause the pressure in the chamber 54 to be quickly reduced to a first high intermediate level at which point the clutch discs should just be free to start slipping. Then, as the pedal is moved from position A1 to position B, the pressure behind the piston 56 should be progresively reduced giving a controlled slip to the clutch for the purpose of inching the vehicle. Once point B is fully attained the clutch disks should be free to rotate as the piston 56 should now be in its fully disengaged position illustrated in FIG. 1. During this movement the cam lobe 270 has not initiated any movement of the actuating member 228 associated with the valve 204 and thus the valve 204 continues to block the flow of fluid from line 218 to the transmission brake 16.

When the pressure is released behind the piston 56, the ball 132 in check valve 60 will no longer be held against its seat by the pressure within the chamber 54 and centrifugal force will cause the ball to move along a radially outwardly extending ramp to open up the passageway 134 to chamber 54. This will in turn permit the fluid within chamber 54 to be exhausted by the action of centrifugal force and the wave washers 75 into the housing 18 where it is thrown by centrifugal action towards the periphery of the rear seal carrier 36 where it can be picked up by the pitot-like tube 94.

Further movement of the pedal from point B to point C should not cause any corresponding movement of either of the actuating members 228 for valves 202 and 204 which should now be both in their fully extended right hand position. Finally, when the pedal is moved from position C to position D the actuating member 228 of valve 204 will be depressed causing pressure to gradually build up within line 226 and the corresponding circuit to the chamber behind the transmission brake piston 118 causing the transmission brake to be gradually applied until it is fully applied. It should be observed that the force applying means or link 288 and spring 304 comes into play as the brake pedal moves past point C to increase pedal effort giving the operator an indication as to when the transmission brake is being applied.

When the clutch pedal is released the transmission brake will be progressively disengaged until it is fully disengaged, the pedal will then move through the dewell period, and then the pressure behind the piston 56 will gradually build up until the pressure is such that the clutch could be fully engaged at which point further movement of the pedal to position A will cause full system pressure to be applied to this piston.

While a preferred structure in which the principles of the present invention have been incorporated is shown and described above, it is to be understood that widely differing means may be employed in the broader aspects of this invention. Accordingly, this invention is intended to embrace all such alternatives, modifications and variations which fall within the spirit and scope of the appended claims.

I claim:

1. A clutch and transmission brake assembly capable of permitting a transmission to be driven by a motor when the clutch is engaged and of braking the transmission after the clutch has been disengaged, said assembly being characterized by a clutch movable between engaged and fully disengaged positions and capable to causing a transmission to be driven when it is in its engaged position and not to be driven when in its disengaged position, the clutch including a fluid pressure operated piston;

a transmission brake disposed between the clutch and the transmission and movable between engaged and disengaged positions and capable of causing the transmission to be braked when in the engaged position, the transmission brake including a fluid pressure operated piston;

first engaging means capable of causing the clutch to be shifted between engaged and fully disengaged positions;

second engaging means capable of causing the transmission brake to be shifted between disengaged and engaged positions; and operating means including a pedal movable between first and second positions through a dwell position and capable of causing said first and second engaging means to be sequentially operated to cause said clutch to be shifted from an engaged to a fully disengaged position as the pedal moves from the first position to the dwell position, and then to cause the transmission brake to be shifted from a disengaged to an engaged position as the pedal moves from the dwell position to the second position the operating means further including force applying means capable of causing pedal effort to increase as the pedal is initially moved from the dwell position towards the second position.

2. The clutch and transmission brake assembly as set forth in claim 1 wherein each of the first and second engaging means includes a valve, and the operating means includes a pair of cams, one of said cams engaging the valve of the first engaging means, and the other of said cams engaging the valve of the second engaging means.

3. The clutch and transmission brake assembly as set forth in claim 2 further characterized by the provision of a mounting bracket, said pair of valves being mounted on the bracket and said pair of cams also being mounted on the bracket for rotational movement about a common axis.

4. The clutch and transmission brake as set forth in claim 3 further characterized by said force applying means cooperating with said bracket.

5. The clutch and transmission brake assembly as set forth in claim 1 further characterized by the provision of a mounting bracket, each of the first and second engaging means including a valve mounted on the bracket, and the operating means including a pair of spaced apart cams interconnected with each other for simultaneous rotation about a common axis, said cams being rotatably interconnected with said bracket and engaging the valves to sequentially operate the valves.

6. The clutch and transmission brake assembly as set forth in claim 5 in which the operating means further includes an operating lever interconnected with said cams and extending away from the cams and force applying means capable of causing pedal effort to increase as the pedal is initially moved from its dwell position towards its second position.

7. A clutch and transmission brake assembly capable of permitting a transmission to be driven by a motor when the clutch is engaged and of braking the transmission after the clutch has been disengaged, said assembly being characterized by:

a clutch movable between engaged and fully disengaged positions and capable of causing a transmission to be driven when it is in its engaged position and not to be driven when in its disengaged position, the clutch including a fluid pressure operated piston;

a transmission brake disposed between the clutch and the transmission and movable between engaged and disengaged positions and capable of causing the transmission to be braked when in the engaged position, the transmission including a fluid pressure operated piston;

first and second engaging means capable of causing the clutch to be shifted between engaged and fully disengaged positions and the transmission brake to be shifted between disengaged and engaged position, respectively, each of the first and second engaging means including a pressure responsive valve; and operating means including a pedal movable between first and second positions through a dwell position and capable of causing said first and second engaging means to be sequentially operated to cause said clutch to be shifted from an engaged to a fully disengaged position as the pedal moves from the first position to the dwell position, and then to cause the transmission brake to be shifted from a disengaged to an engaged position as the pedal moves from a dwell position to the second position, said operating means cooperating with the valves in such a manner as to cause the pressure behind the fluid pressure operated piston to be quickly dropped from full system pressure to a high intermediate pressure as the pedal is moved from the first position to a first intermediate position between the first position and the dwell position, the high intermediate pressure normally being capable of causing the clutch to be maintained in its engaged position, the pressure behind the piston then being gradually reduced until the clutch is fully disengaged as the pedal is moved from the first intemediate position towards the dwell position, said gradual reduction of pressure permitting inching.

8. The clutch and transmission brake assembly as set forth in claim 7 wherein the valve associated with the second engaging means is sequentially operated after the pressure behind the clutch piston has been reduced to such a level as to cause the clutch to be disengaged to progressively increase the pressure behind the piston associated with the transmission brake to gradually apply the transmission brake.

9. The clutch and transmission brake assembly as set forth in claim 8 in which said operating means includes means capable of causing the pedal effort to increase as the pedal is intially moved from its dwell position towards its second position.

* * * * *